US009628863B2

(12) United States Patent
Ma et al.

(10) Patent No.: US 9,628,863 B2
(45) Date of Patent: Apr. 18, 2017

(54) INTERACTIVELY COMBINING END TO END VIDEO AND GAME DATA

(71) Applicant: Palmwin Information Technology (Shanghai) Co. Ltd., Shanghai (CN)

(72) Inventors: Huanan Ma, Jiangsu (CN); Xueyuan Zhang, Jiangsu (CN); Huaichang Zhang, Jiangsu (CN); Guoqiang Zhang, Jiangsu (CN)

(73) Assignee: Palmwin Information Technology (Shanghai) Co. Ltd., Shanghai (CN)

( * ) Notice: Subject to any disclaimer, the term of this patent is extended or adjusted under 35 U.S.C. 154(b) by 328 days.

(21) Appl. No.: 14/466,337

(22) Filed: Aug. 22, 2014

(65) Prior Publication Data

US 2015/0352446 A1    Dec. 10, 2015

(30) Foreign Application Priority Data

Jun. 5, 2014   (CN) .......................... 2014 1 0245768
Jun. 9, 2014   (CN) .......................... 2014 1 0251312

(51) Int. Cl.
| | | |
|---|---|---|
| *A63F 13/52* | (2014.01) | |
| *H04N 21/478* | (2011.01) | |
| *A63F 13/65* | (2014.01) | |
| *A63F 13/352* | (2014.01) | |
| *H04N 7/14* | (2006.01) | |
| *A63F 13/86* | (2014.01) | |
| *A63F 13/355* | (2014.01) | |

(Continued)

(52) U.S. Cl.
CPC ....... *H04N 21/4781* (2013.01); *A63F 13/352* (2014.09); *A63F 13/52* (2014.09); *A63F 13/65* (2014.09); *H04N 7/147* (2013.01); *A63F 13/355* (2014.09); *A63F 13/86* (2014.09); *H04N 21/4316* (2013.01); *H04N 21/4788* (2013.01)

(58) Field of Classification Search
CPC .... H04N 21/4781; H04N 7/147; A63F 13/52; A63F 13/352; A63F 13/65
See application file for complete search history.

(56) References Cited

U.S. PATENT DOCUMENTS 8,775,332 B1 *   7/2014  Morris .................... G06N 5/02
                                                  706/11
9,357,165 B2 *   5/2016  Lu ........................... H04N 7/15
(Continued)

*Primary Examiner* — Corbett B Coburn
(74) *Attorney, Agent, or Firm* — Fenwick & West LLP

(57) ABSTRACT

A solution to enhance user experience in video communication and online game playing is presented in a digital data sharing environment for mobile communications devices. A first communication terminal receives video data and game data from a second communication terminal. The video data is from the video communication between the two terminals and the game data is from a game played on the two terminals while the video communication is in session. The first terminal combines the video data associated with the first terminal with the received video data to generate combined video data and combines game data associated with the first terminal with the received game data to generate combined game data. The first terminal determines a presentation strategy to display the combined video data and the combined game data on a display of the first communication terminal and display the combined video and game data accordingly.

30 Claims, 12 Drawing Sheets

(51) Int. Cl.
*H04N 21/431* (2011.01)
*H04N 21/4788* (2011.01)

(56) References Cited

U.S. PATENT DOCUMENTS

| | | | | |
|---|---|---|---|---|
| 2004/0098753 | A1* | 5/2004 | Reynolds | H04N 7/17318 |
| | | | | 725/135 |
| 2006/0200842 | A1* | 9/2006 | Chapman | H04N 7/163 |
| | | | | 725/34 |
| 2011/0128300 | A1* | 6/2011 | Gay | G06T 19/006 |
| | | | | 345/633 |
| 2011/0305443 | A1* | 12/2011 | Sasaki | H04N 13/0029 |
| | | | | 386/357 |

\* cited by examiner

INTERACTIVELY COMBINING END TO END VIDEO AND GAME DATA

TECHNICAL FIELD

The disclosure relates generally to Internet based digital media processing, and specifically to interactively combining end to end video and game data for mobile computing devices.

BACKGROUND

The development of digital media content sharing and Internet social networking has enabled many features to enhance the user experience such as end to end video communications and interactive online gaming. The increasingly popular smart handheld devices, such as smart phones, tablet computers, and increased network bandwidth (for wired and wireless networks) have provided more communications platforms for digital media content consumption and sharing. For example, a video call between two parties on their smart phones allows the parties to communicate more interactively with each other. Similarly, a multiplayer online game can be played over the Internet on game consoles or mobile phones with other players around the world.

However, the proliferation of digital media sharing and smart handheld devices for interactive communication/sharing has highlighted a number of challenges including efficient and enhanced user experience of consuming both video and game data simultaneously. Existing solutions render a video session and a game session independently from each other on a user's communication device, e.g., a smart phone. Separating the video session from the game session may prevent the user from enjoying playing the game while having a video communication with another party. Without video chat while in playing a game on a smart phone may decrease the interest in the game between the game players.

SUMMARY

Embodiments of the invention enhance user experience in video communication and online game playing is presented in a digital data sharing environment for mobile communications devices. A first communication terminal receives video data and game data from a second communication terminal. The video data is from the video communication between the two communication terminals and the game data is from a game played on the two terminals while the video communication is in session. The first communication terminal combines the video data associated with the first communication terminal with the received video data to generate combined video data and combines game data associated with the first communication terminal with the received game data to generate combined game data. The first communication terminal determines a presentation strategy to display the combined video data and the combined game data on a display of the first communication terminal and display the combined video and game data accordingly To determine the presentations strategy to display the combined video data and the combined game data on the display of the first communication terminal, the first terminal may consider the game performance of a user of the first terminal. Based on the evaluation of the game performance of the user of the first terminal, the first terminal may adjust the presentation configurations of a video window for displaying the video data associated with the second communication terminal, such as changing the transparency of the video window, changing the location of the video window and changing the resolution of the video content of the video data displayed in the video window.

The second communication terminal can also determine the presentation strategy for displaying the video data associated with the second communication terminal on the display of the first communication terminal. The second communication terminal determines an encoding strategy to encode the video data associated with the second communication terminal based on the game performance of the user of the first communication terminal and encodes the video data accordingly. The encoded video data includes information on presentation configuration of displaying the video data associated with the second communication terminal on the display of the first communication terminal. The first communication terminal decodes the encoded video data and displays the decoded video data according the presentation configurations determined by the second communication terminal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

System Overview

Figure 1:
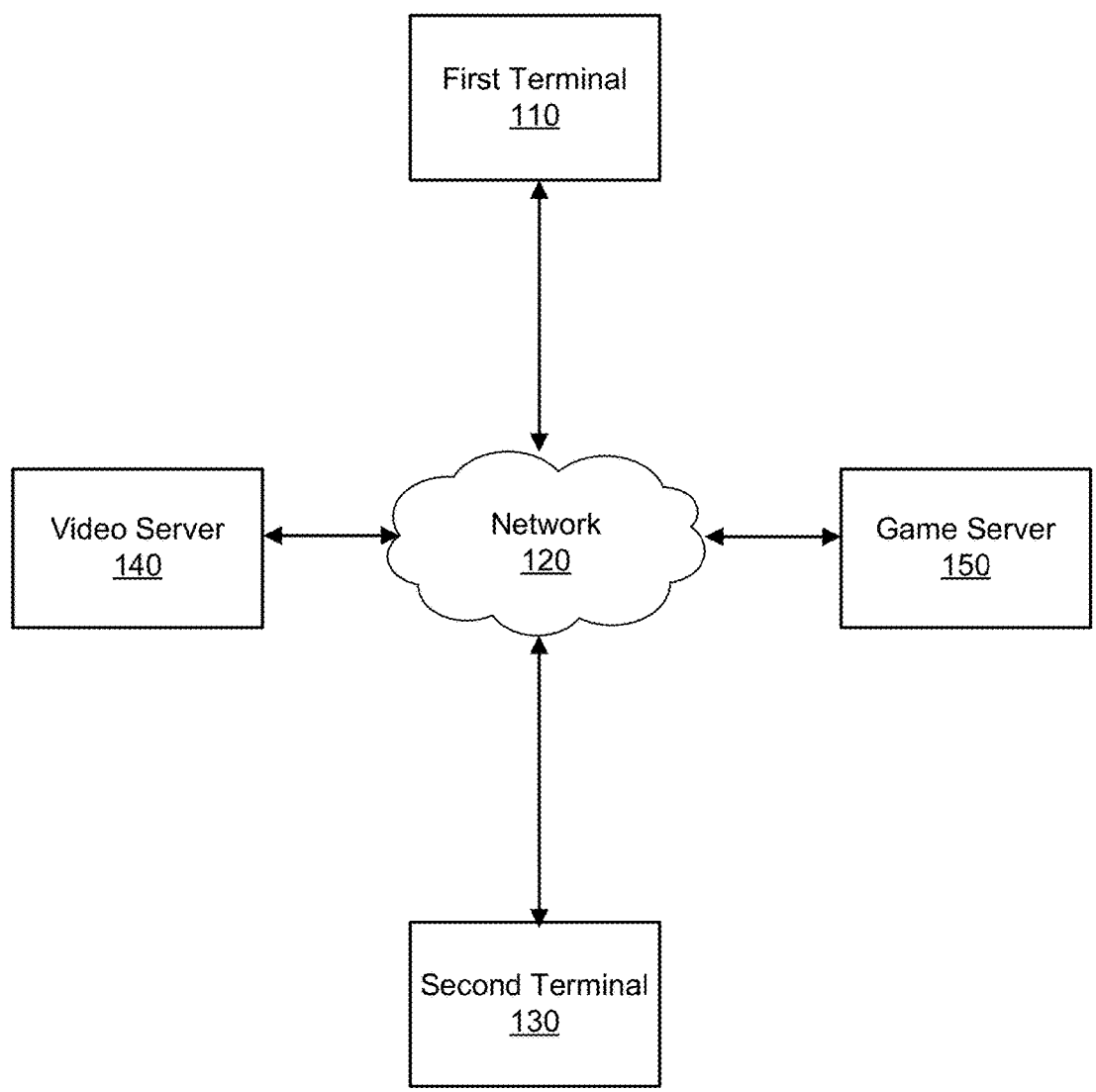
FIG. 1 is a block diagram of a computing environment for interactively combining end to end video and game data for mobile computing devices according to one embodiment.

FIG. 1 is a block diagram of a computing environment for interactively combining end to end video and game data for mobile computing devices according to one embodiment. The computing environment includes a first communication terminal 110 (also refers to as "first terminal") communicates with a second communication terminal 130 (also refers to as "second terminal") over a network 120. The computing environment also includes a video server 140 and a game sever 150 to facilitate the exchange of video data and game data between the first terminal 110 and the second terminal 130. Only two terminals (110 and 130), one video server 140 and one game server 150 are shown in FIG. 1 in order to simplify and clarify the description. Embodiments of the computing environment can have many communication terminals, video servers 140 and game servers 150 connected to the network 120. Likewise, the functions performed by the various entities of FIG. 1 may differ in different embodiments.

In one embodiment, a user of the first terminal 110 wants to video chat with a user of the second terminal 130 while playing an online game with the user of the second communication terminal 130. The first terminal 110 generates local video data and local game data from the video communication and game playing with the second terminal 130. Similarly, the second terminal 130 generates its own local video data and local game data from the video communication and game playing with the first terminal 110. A video and game combining module of the first terminal 110 generates combined video data and game data for the first terminal 110 and a presentation strategy for the first terminal 110. An interface presenting module of the first terminal 110 presents the combined video data and game data on a display of the first terminal 110 according to the presentation strategy. A corresponding video and game combining module and an interface presenting module of the second terminal 130 may perform the same or similar functions for the second terminal 130. The first terminal 110 and the second terminal 130 are further described below with reference to FIG. 3, FIG. 5 and FIG. 7.

The video server 140 is a computer server that facilitates video communication among multiple communication terminals. In one embodiment, the video server 140 is dedicated to delivery video data generated from the video communications between the first terminal 110 and the second terminal 130. The video server 140 is further configured to perform various functions for provisioning video, such as recording, encoding, decoding, storing and playing back. Other embodiments of the video server 140 include additional and/or different functions than described herein.

The game sever 150 is a computer server that facilitates online gaming among multiple players. In one embodiment, the game server 150 is the source of events of a multiple player video game. The game server 150 receives and processes each player's input such as current status and game performance data of the player. The game server 150 transmits received status data and game performance data of a player to other players to allow the players connected to the game server to maintain their own accurate version of the game world. Other embodiments of the game server 150 include additional and/or different functions than described herein.

The network 120 enables communications among the first terminal 110, the second terminal 130, the video server 140 and the game server 150 and can comprise the Internet as well as wireless communications networks. In one embodiment, the network 120 uses standard communications technologies and/or protocols. Thus, the network 120 can include links using technologies such as Ethernet, 802.11, worldwide interoperability for microwave access (WiMAX), 4G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

A communication terminal, e.g., the first terminal 110 or the second terminal 130, is an electronic device used by a user to perform functions such as communicating and consuming digital media content including video chat, executing software applications, browsing websites hosted by web servers on the network 120 and interacting with the video server 140 and the game sever 150. For example, the communication terminal may be a smart phone, or a tablet, notebook, or desktop computer or a dedicated game console. The communication terminal includes and/or interfaces with a display device on which the user may view the video files and other digital content. In addition, the communication terminal provides a user interface (UI), such as physical and/or on-screen buttons, with which the user may interact with the communication terminal to perform functions such as video chatting, playing an online video game, selecting digital content, downloading samples of digital content, and purchasing digital content. An exemplary communication terminal is described in more detail below with reference to FIG. 3, FIG. 5 and FIG. 7.

Computing System Architecture

Figure 2:
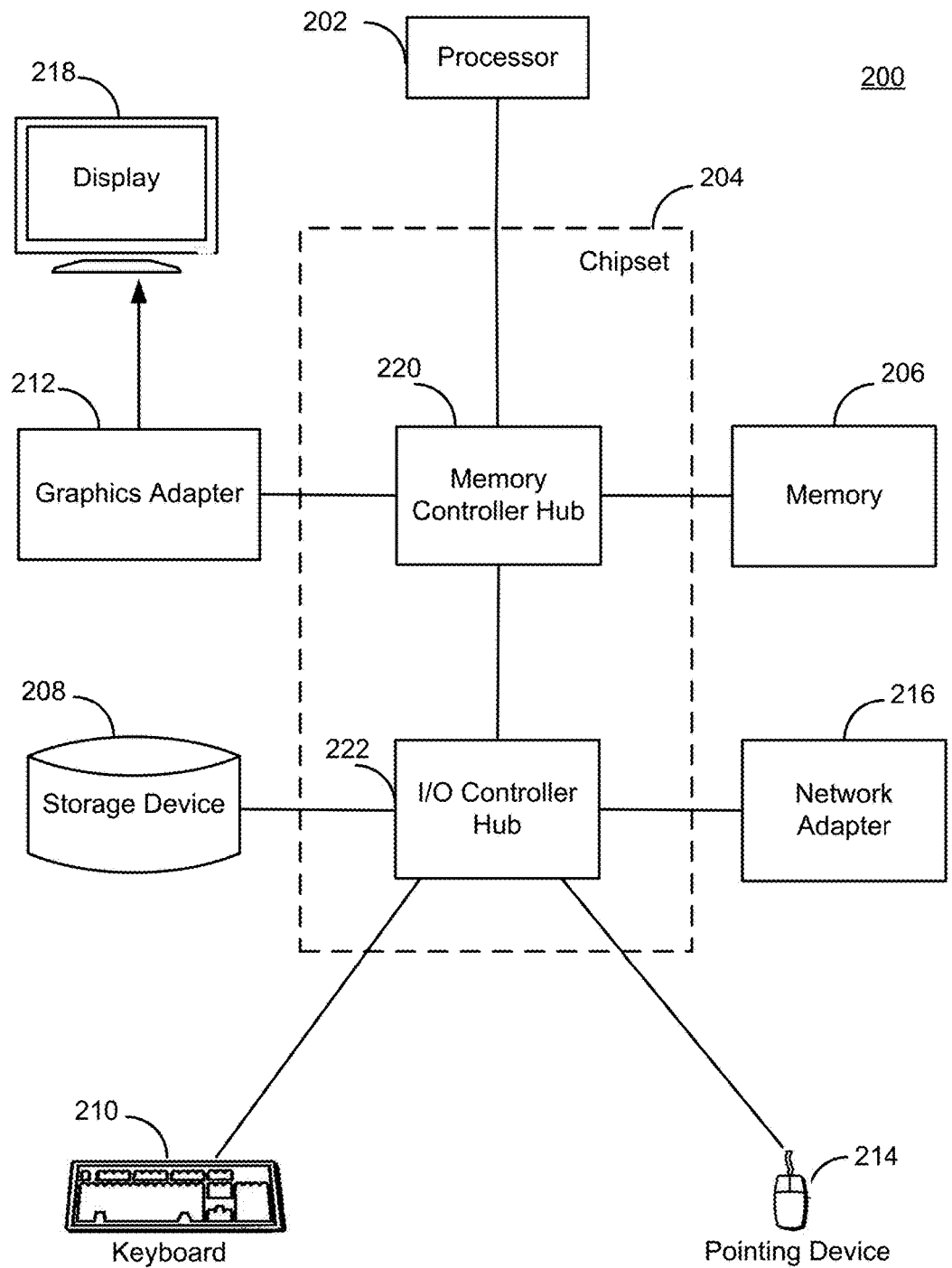
FIG. 2 is a block diagram illustrating an example of a computing device for acting as a communication terminal in one embodiment.

The entities shown in FIG. 1 are implemented using one or more computers. FIG. 2 is a high-level block diagram of a computer 200 for acting as the first terminal 110, the second terminal 130, the video server 140 and/or the game server 150. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In one embodiment, the display 218 receives visual input generated by the processor 202. For example, the touch sensitive surface of the display 218 detects the touch operation on or near the touch sensitive surface and transmits the touch operation to the processor 202 to determine a type of the touch event. The processor 202 provides, according to the type of the touch event, a corresponding visual output to the display 218 for display.

The computer 200 functioning as the first terminal 110 or the second terminal 130 may further include a sensor, such as an optical sensor and a motion sensor. The first terminal 110 or the second terminal 130 may also have an audio circuit, a loudspeaker, and a microphone to provide audio interfaces between a user and the terminal. A WiFi module can be included in the first terminal 110 or the second terminal 130 to provide wireless Internet access for the user, who can send or receive emails, browse webpages and access streaming media.

In addition, the computer 200 can lack certain illustrated components. For example, the computers acting as the video server 140 or the game server 150 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Interactive Combination of Video Data and Game Data

Figure 3:
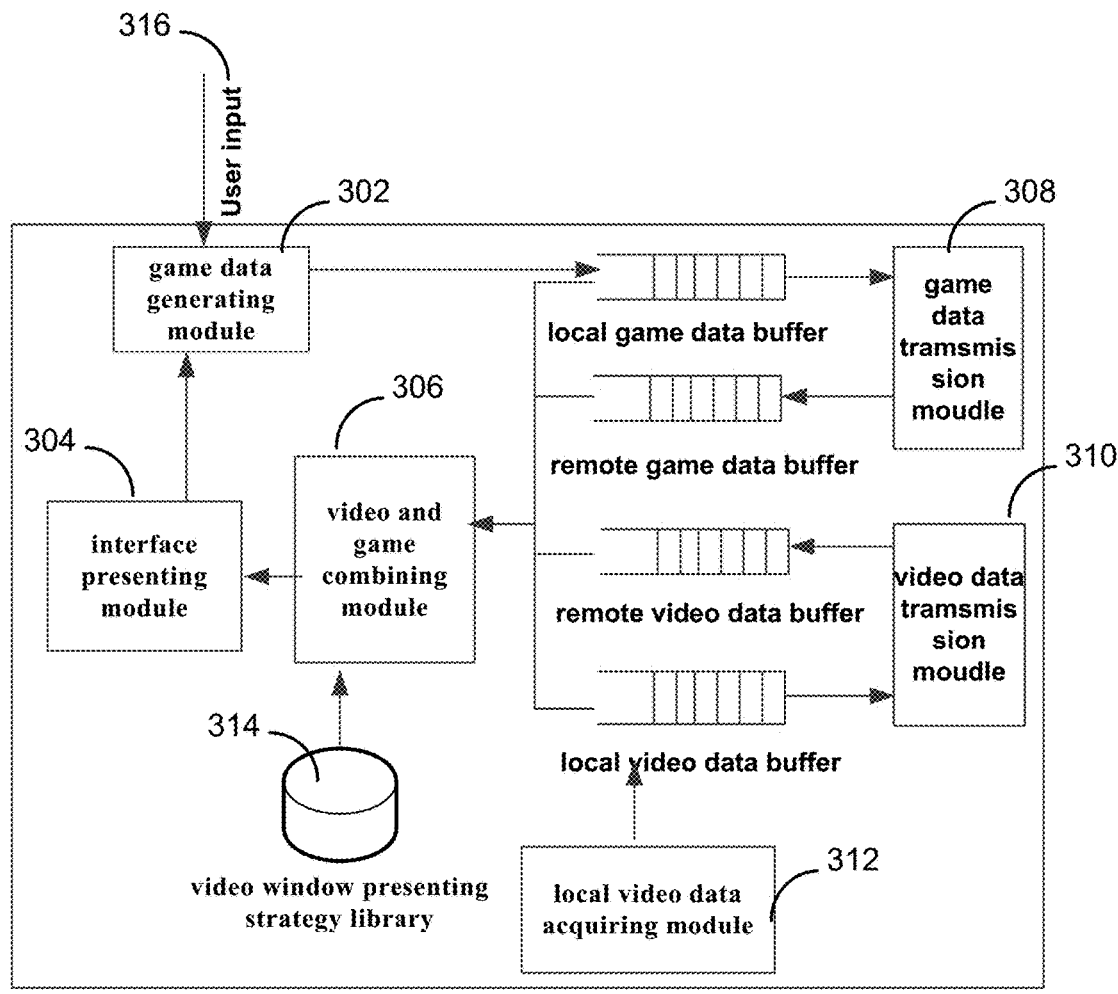
FIG. 3 is a block diagram illustrating a communication terminal for interactively combining end to end video and game data according to one embodiment.

FIG. 3 is a block diagram illustrating a communication terminal, e.g., the first terminal 110 or the second terminal 130, for interactively combining end to end video and game data according to one embodiment. For simplicity of illustration, assume the modules illustrated in FIG. 3 are for the first terminal 110, which is a smart handheld device such as a smart phone. The second terminal 130 may contain the same modules and/or additional or different modules from the ones described below. In the embodiment shown in FIG. 3, the first terminal 110 has a game data generating module 302, an interface presenting module 304, an video and game combining module 306, a game data transmission module 308, a video transmission module 310, a local video data acquiring module 312 and a video window presenting strategy library 314. Other embodiments may contain different functional modules and different number of modules.

The game data generating module 302 generates local game data for the first terminal 110 and stores the generated local game data in a local game data buffer of the first terminal 110. In one embodiment, the game data generating module 302 generates the local game data based on user input 326 from a user of the first terminal 110, who plays a video game with a user of the second terminal 130, and currently displayed game data by the interface presenting module 304 of the first terminal 110. The generated game data is local to the first terminal 110 because the game data is particularly associated with the first terminal 110. In other words, the game data associated with a counter party of the first terminal 110, e.g., the seconder terminal 130, is referred to as remote game data. In one embodiment, the local game data includes information describing the current performance of the player of the game (i.e., the user of the first terminal 110) and properties associated with a game interface of the first terminal 110 that displays the game being played, such as location, size and shape of the game interface.

The game data transmission module 308 retrieves the local game data associated with the first terminal 110 from the local game data buffer of the first terminal 110 and transmits the local game data to the second terminal 130. The game data transmission module 308 also receives remote game data associated with the second terminal 130 from the second terminal 130 and stores the remote game data in a game data buffer allocated for the remote game data in the first terminal 110. In one embodiment, the game data transmission module 308 simultaneously receives the remote game data from the second terminal 130 and transmits the local game data to the second terminal 130. The local game data associated with the first terminal 110 and the remote game data associated with the second terminal 130 are combined to generate combined game data.

The local video data acquiring module 312 acquires local video data associated with the first terminal 110 and stores the local video data in a local video data buffer of the first terminal 110. In one embodiment, the local video data acquiring module 312 acquires the local video data through a local video capture component, e.g., a digital camera embedded with the first terminal 110. Video data associated with the second terminal 130 is referred to as remote video data. In one embodiment, the source of the video data is from communications between the first terminal 110 and the second terminal 130 such as video chat supported by a video communication service, e.g., Skype or QQ Video Chat.

The video data transmission module 310 retrieves the local video data associated with the first terminal 110 from the local video data buffer of the first terminal 110 and transmits the local video data to the second terminal 130. The video data transmission module 310 also receives remote video data associated with the second terminal 130 from the second terminal 130 and stores the remote video data in a video data buffer allocated for the remote video data in the first terminal 110. In one embodiment, the video data transmission module 310 simultaneously receives the remote video data from the second terminal 130 and transmits the local video data to the second terminal 130. The local video data associated with the first terminal 110 and the remote video data associated with the second terminal 130 are combined to generate combined video data.

The video and game combining module 306 interactively combines the local game data, the remote game data, the local video data and the remote video data to generate combined data for display. The combined data includes combined video data and combined game data, where the combined video data includes the local video data and the remote video data and the combined game data includes the local game data and the remote game data. Each video data of the combined video data is displayed in a video window on a display of the first terminal 110, e.g., the screen of a smart phone, and the combined game data is displayed in a game interface on the same display of the first terminal 110.

In one embodiment, the video and game combining module 308 determines, according to a presenting strategy, the relative positions of the video windows and the game interface with respect to the display of the first terminal 110. For example, the video and game combining module 306 determines presentation coordinates, configuration and size of a video window to display the local video data of the combined video data and the presentation coordinates, configuration and size of the game interface for displaying the combined game data. Similarly, the video and game combining module 306 also determines presentation coordinates, configuration and size of a video window to display the remote video data of the combined video data and the presentation coordinates, configuration and size of the game interface for displaying the combined game data.

In one embodiment, the presenting strategy indicates that a video window for the video data (e.g., the local video data or the remote video data of the combined video data) is independent from the game interface. In this case, the video windows and the game interface occupy a non-overlapping portion of the display of the first terminal 110. In another embodiment, the presenting strategy indicates that the video window is embedded with the game interface. In this case, the video and game combining module 306 determines the presentation coordinates, configuration and size of the video window with respect to the presentation coordinates, configuration and size of the game interface, such as where the video window is located inside the game interface and how large the video window should be. In addition, in the case where the video window is embedded with the game interface, the video and game combining module 306 also determines how to adjust the video window in response to a change to the game interface.

The video window presenting strategy library 314 stores one or more presenting strategies for presenting the combined video data on the display of the first terminal 110. In one embodiment, the presenting strategy includes instructions for presenting the combined video data in two video windows separately from a game interface for presenting the combined game data. In another embodiment, the presenting strategy includes instructions for presenting the combined video data in two video windows embedded in a game interface for presenting the combined game data. The presenting strategy for embedding the video windows with the game interface may further include instructions for adjusting the video windows responsive to a change to the game interface. In one embodiment, the presenting strategies stored in the video window presenting strategy library 314 are predetermined based on experimental data. In another embodiment, the presenting strategies are determined based on real time video data and game data collected at the first terminal 110.

The interface presenting module 304 presents the combined video data and game data in a display of the first terminal 110 according to a presenting strategy determined by the video and game combining module 306. For example, responsive to the presenting strategy for separately presenting the combined video data within the game interface for the combined game data, the interface presenting module 304 presenting the each video data (i.e., the local video data and the remote video data) in the determined location described by the corresponding coordinates and in the dimensions defined by the size of the video window. The real time game data presented in the interface presenting module 304 is inputted into the game data generating module 302 to reflect the current status of the game being played by the users of the first terminal 110 and the second terminal 130.

Figure 4:
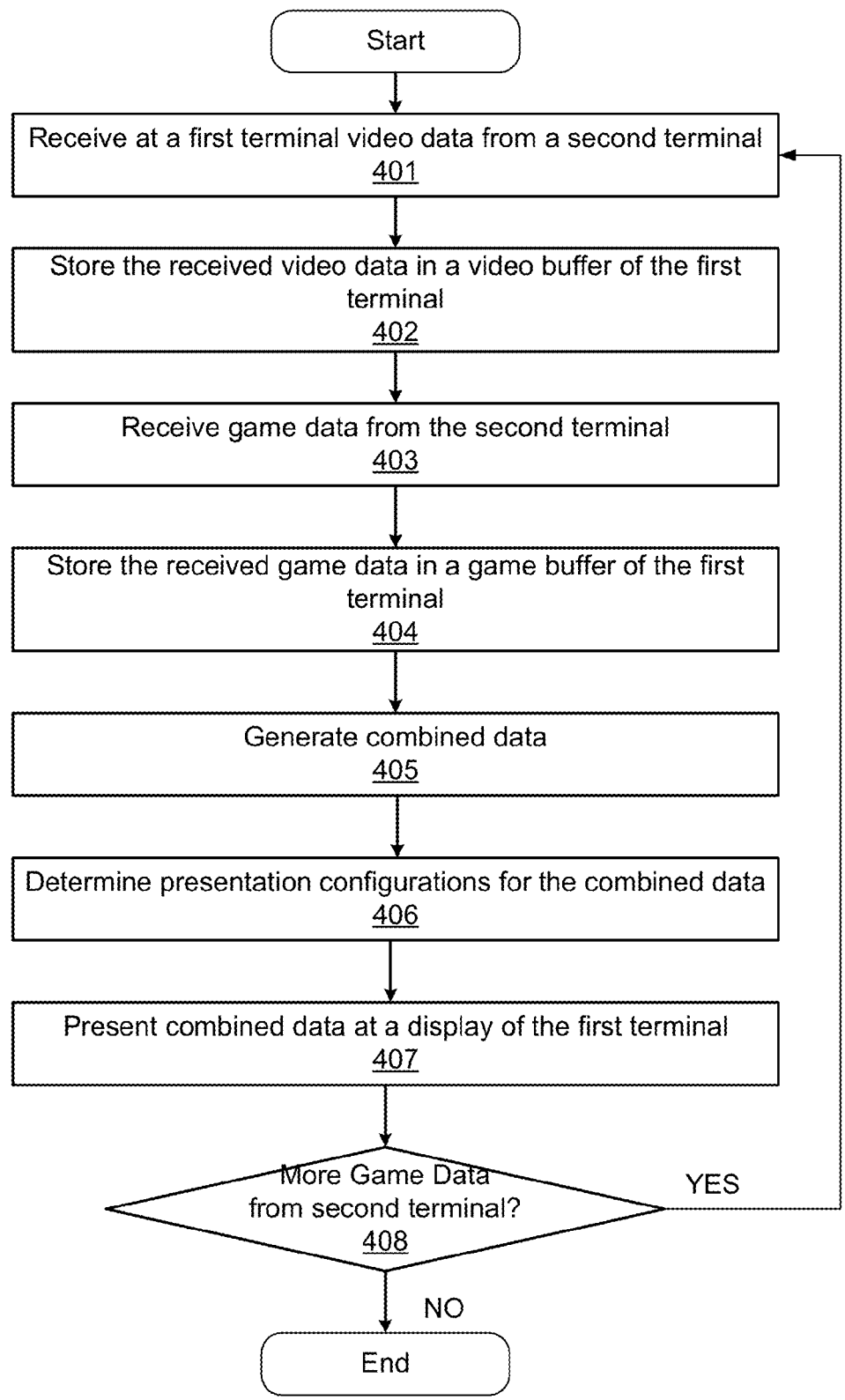
FIG. 4 is a flowchart illustrating a process of interactively combining end to end video and game data for the communication terminal illustrated in FIG. 3.

FIG. 4 is a flowchart illustrating a process of interactively combining end to end video and game data for the communication terminal (e.g., the first terminal 110) illustrated in FIG. 3. Initially, the first terminal 110 receives 401 remote video data from the second terminal 130 and stores 402 the received video data in a video buffer of the first terminal 110. The first terminal 110 receives 403 remote game data from the second terminal 130 and stores 404 the received game data in a game buffer of the first terminal 110. The first terminal 110 generates 405 the combined data by combining local video data associated with the first terminal 110 with the received remote video data and by combining local game data associated with the first terminal 110 with the received remote game data.

The first terminal determines 406 presentation configurations for the combined data, where the presentation configuration includes instructions on the relative positions of video windows for presenting the combined video data to a game interface for presenting the combined game data. The instructions include presentation coordinates and sizes of the video windows. The first terminal presents 407 the combined video data and the combined game data on the display of the first terminal 110 according to the presentation configurations. The first terminal 110 further checks 408 whether more game data comes from the second terminal 130. Responsive to more game data coming from the second terminal 130 (i.e., the game is not over), the first terminal 110 repeats the steps 401 to 407; otherwise, the first terminal 110 exists the process of combining the video data and game data of the two terminals.

To further illustrate the process described above, FIG. 11A and FIG. 11B illustrate exemplary presentations of combined video data and game data on a smart phone (e.g., the first terminal 110) according to one embodiment. A user of the smart phone, "A" 1102, communicates with a user of another smart phone, "B" 1104, through a video communication (e.g., video chat). While user A 1102 and user B 1104 engage in the video communication, user A 1102 and user B 1104 are playing a racing game. To win the racing game, user A 1102 competes against user B 1104 to reach their respective destination, 1134 and 1132, respectively, as fast as possible.

Figure 11A:
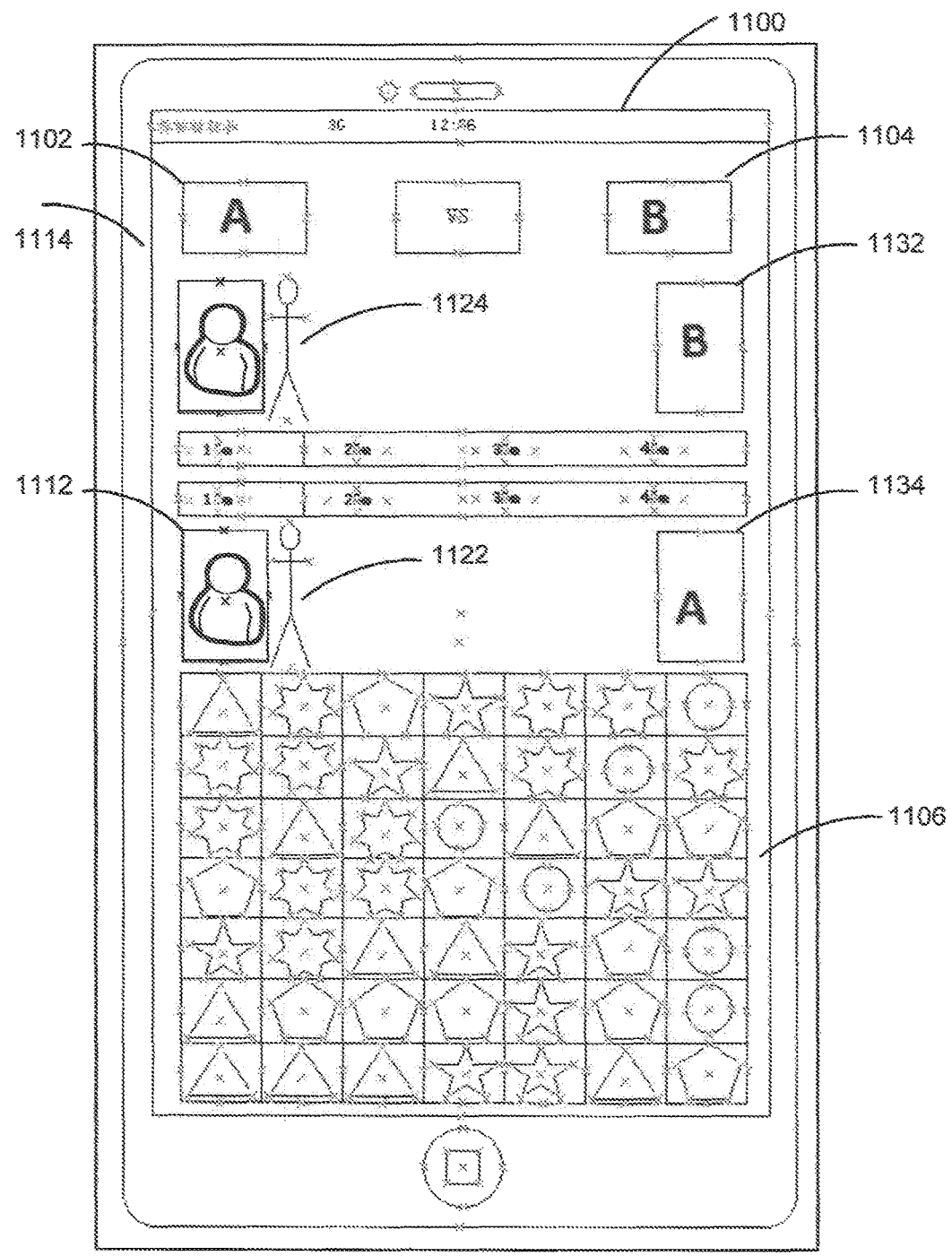
FIG. 11A illustrates an exemplary presentation of combined video data and game data on a smart phone according to one embodiment.

FIG. 11A illustrates a starting state of a display interface 1100 of the smart phone in the illustration. The local video data associated with user A 1102 is represented by an icon 1112 and remote video data associated with user B 1104 of the other smart phone (e.g., the second terminal 130) is represented by an icon 1114. The local video data associated with user A 1102 is captured by a video capture component of the smart phone and the remote video data associated with user B 1104 is received from the smart phone used by user B 1104. The local game data associated with user A 1102 is represented by a symbol 1122 and the remote game data associated with user B 1104 is represented by a symbol 1124. The local game data associated with user A 1102 is generated by user A's input while playing the game and the remote game data associated with user B 1104 is received from the smart phone used by user B 1104.

The video and game combining module of the smart phone illustrated in FIG. 11A combines the local video data associated with user A 1102 with the remote video data associated with user B 1104 to generate combined video data and combines the local game data associated with user A 1102 with the remote game data associated with user B 1104 to generate combined game data. In the embodiment illustrated in FIG. 11A, the presentation strategy is to embed video windows to display the combined video data within a game interface 1106 for displaying the combined game data. In the embodiment illustrated in FIG. 11A, the rectangular circling the icon 1112 represents the video window to display the local video data of user A 1102 and the rectangular circling the icon 1114 represents the video window to display the remote video data of user b 1104. The presentation strategy defines the coordinates and size of the video window for the local video data relative to the dimensions and coordinates of the game interface 1106. The presentation strategy defines similarly the coordinates and size of the video window for the remote video data relative to the dimensions and coordinates of the game interface 1106. Responsive to the progress of the game, the game interface may change and the video windows are adjusted according to the change to the game interface.

Figure 11B:
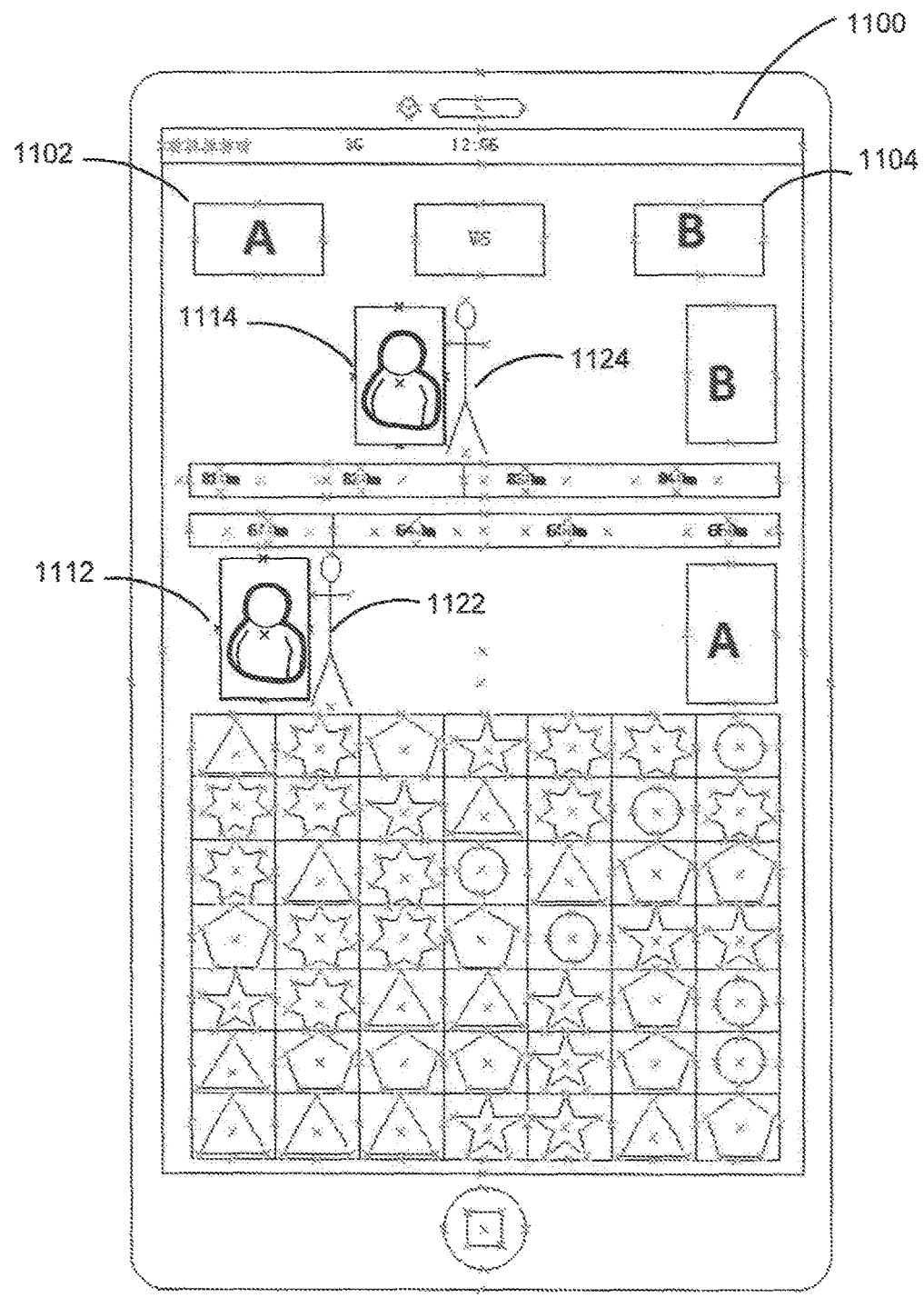
FIG. 11B illustrates another exemplary presentation of combined video data and game data on a smart phone according to one embodiment.

FIG. 11B illustrates current state of the display interface 1100 of the smart phone as the game progresses. As shown in FIG. 11B, user B 1104 is playing better than user A 1102 because user B 1104 races faster than user A 1102. The progress of both user A 1102 and user B 1104 are shown by the current positions of their game symbols, 1124 and 1122, respectively. As the game progresses, the game interface for presenting the game data is updated by showing the performance of both users 1102 and 1104 in the display. Given the presentation strategy of embedding the video windows within the game interface, the video window for presenting the local video data and video window for presenting the remote video data are adjusted to the update of the game interface (e.g., the adjustment is shown by the moved rectangles circling the video icons 1114 and 1112).

Figure 5:
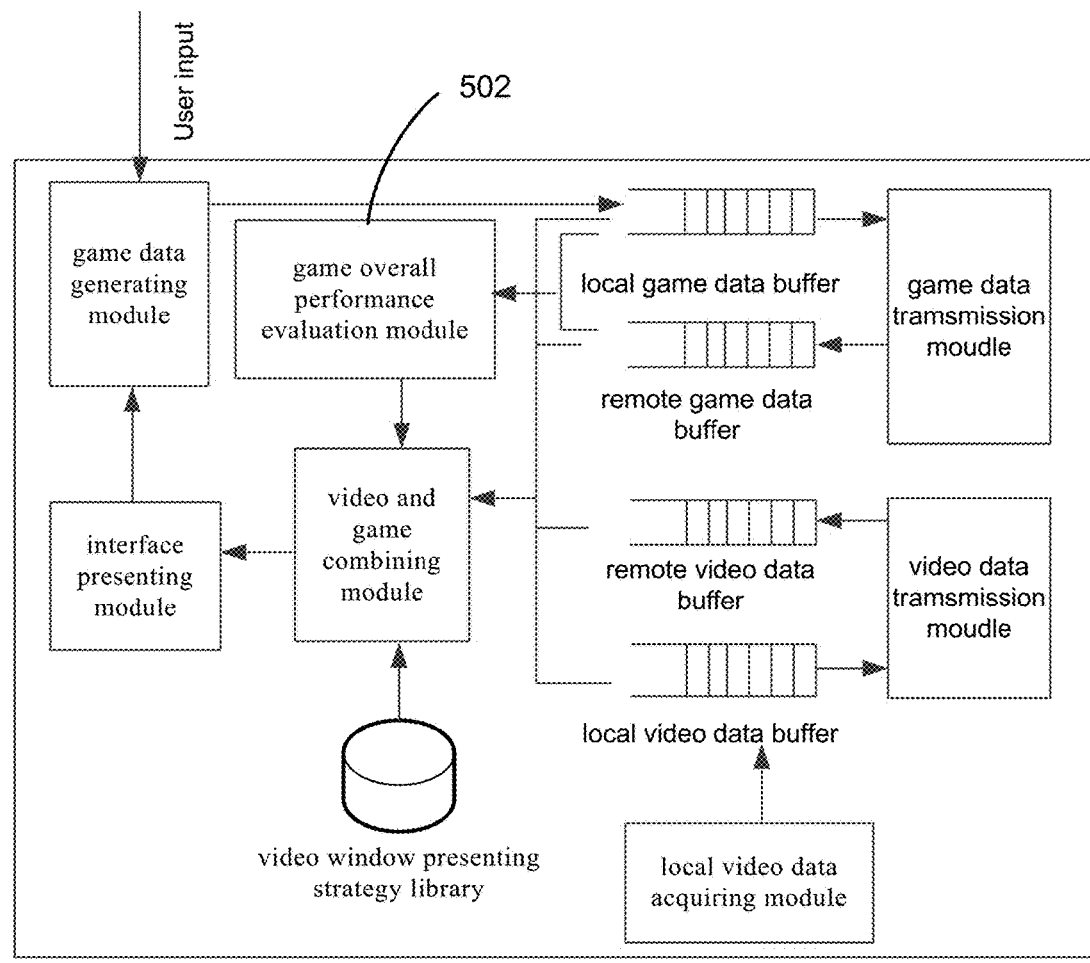
FIG. 5 is a block diagram illustrating a communication terminal for interactively combining end to end video and game data according to another embodiment.

Turning now to FIG. 5, FIG. 5 is a block diagram illustrating a communication terminal (e.g., the first terminal 110) for interactively combining end to end video and game data according to another embodiment. Comparing with the first terminal 110 illustrated in FIG. 3, the first terminal 110 illustrated in FIG. 5 comprises the identical computing modules/components except an additional game overall performance evaluation module 502. The game overall performance evaluation module 502 evaluates the overall game performance of the user of the first terminal 100 in course of playing a game with a user of the second terminal 130. Based on the evaluation the game overall performance of the user of the first terminal 110, the video and game combining module of the first terminal 110 determines a presentation strategy for a video window to display the remote video data.

Generally, a video window for presenting the local video data can be unconstrained within a display of a communication terminal, from which the local video data is generated. However, presenting remote video data associated with a counter party (e.g., the second terminal 13) on the display of the communication terminal can be closely related to the overall game performance of the user of the terminal that generates the local video data. Taking the first terminal 110 illustrated in FIG. 5 as an example, the presenting strategy for presenting the remote video data received from the second terminal 130 at the display of the first terminal 110 is closely related to the game performance of the user of the first terminal 110.

In one embodiment, the user's overall game performance is measured in terms of the user's participation in the game (e.g., how fast the user hits the touch screen of the first terminal 110), game duration and percentage of points earned by the user over a threshold value. The user's overall game performance can be classified into different grades, each of which has a corresponding performance measurement grade, e.g., a numeric value. The game overall performance evaluation module 502 may also define one or more game performance threshold values and compares the user's game performance with the threshold values. Based on the comparison, the game overall performance evaluation module 502 recommends various controls of the video window for displaying the remote video data. Examples of recommended controls include level of transparency and location of the video window and resolution of the video data displayed within the video window.

Taking controlled transparency of the video window as an example, responsive to the user's game performance grade not exceeding a predefined threshold value for transparency consideration, the game overall performance evaluation module 502 recommends an opaque transparency for the video window to display the remote video data; in other words, the video window for displaying the remote video data is invisible on the display of the first terminal 110.

Figure 10:
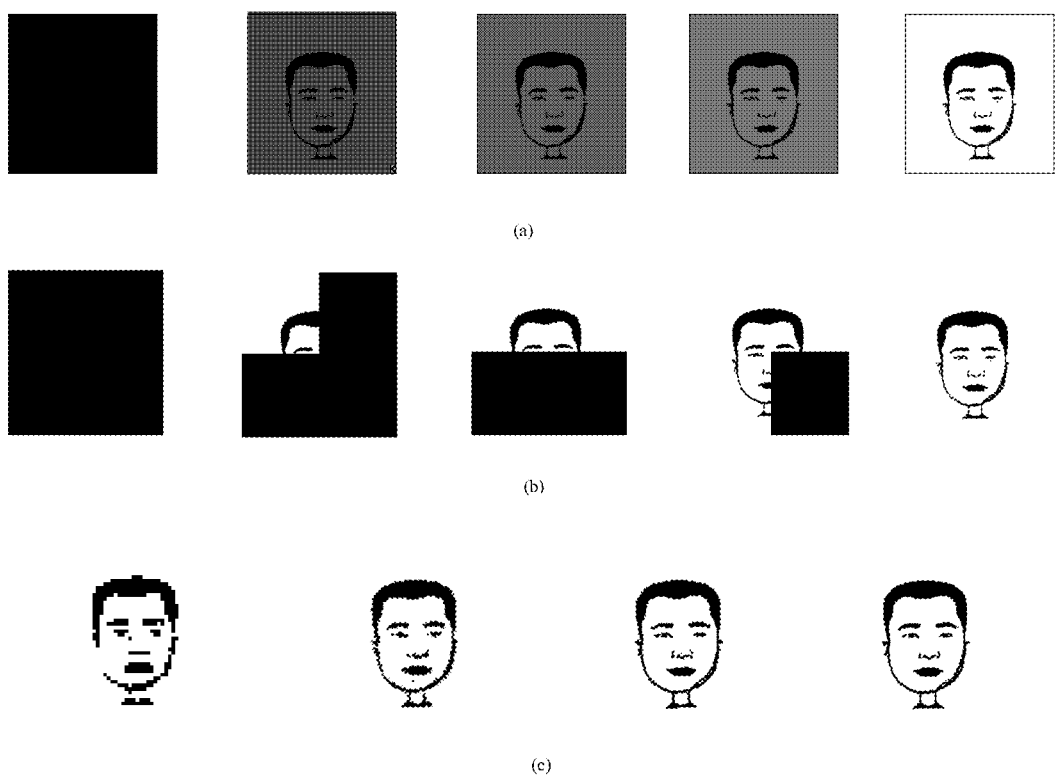
FIG. 10 illustrates a controlled presentation of remote video data on a communication terminal according to one embodiment.

Referring now to FIG. 10, FIG. 10 illustrates a controlled presentation of remote video data associated with the second terminal 130 on the display of the first terminal 110 according to one embodiment. FIG. 10(*a*) show five levels of transparency of a video window to display remote video data, starting from completely invisible (the leftmost window) to completely visible (the rightmost window). FIG. 10(*b*) show controlled locations to display the remote video data, starting from no location allocated for displaying the remote video data (the leftmost window) to a location to show the full size of the video window (the rightmost window). FIG. 10(*c*) show five levels of resolution of video content of the remote video data, starting from lowest resolution (the leftmost window) to the highest resolution (the rightmost window).

It is noted that different games can have different degrees of complexity when measuring the players' overall game performance. In one embodiment, the game overall performance evaluation module 502 measures the game performance of the user of the first terminal 110 for simple games. For complex games, the game overall performance evaluation module 502 receives the game performance evaluation of the user of the first terminal 110 from a game server, such as the gamer server 150 illustrated in FIG. 1.

Figure 6:
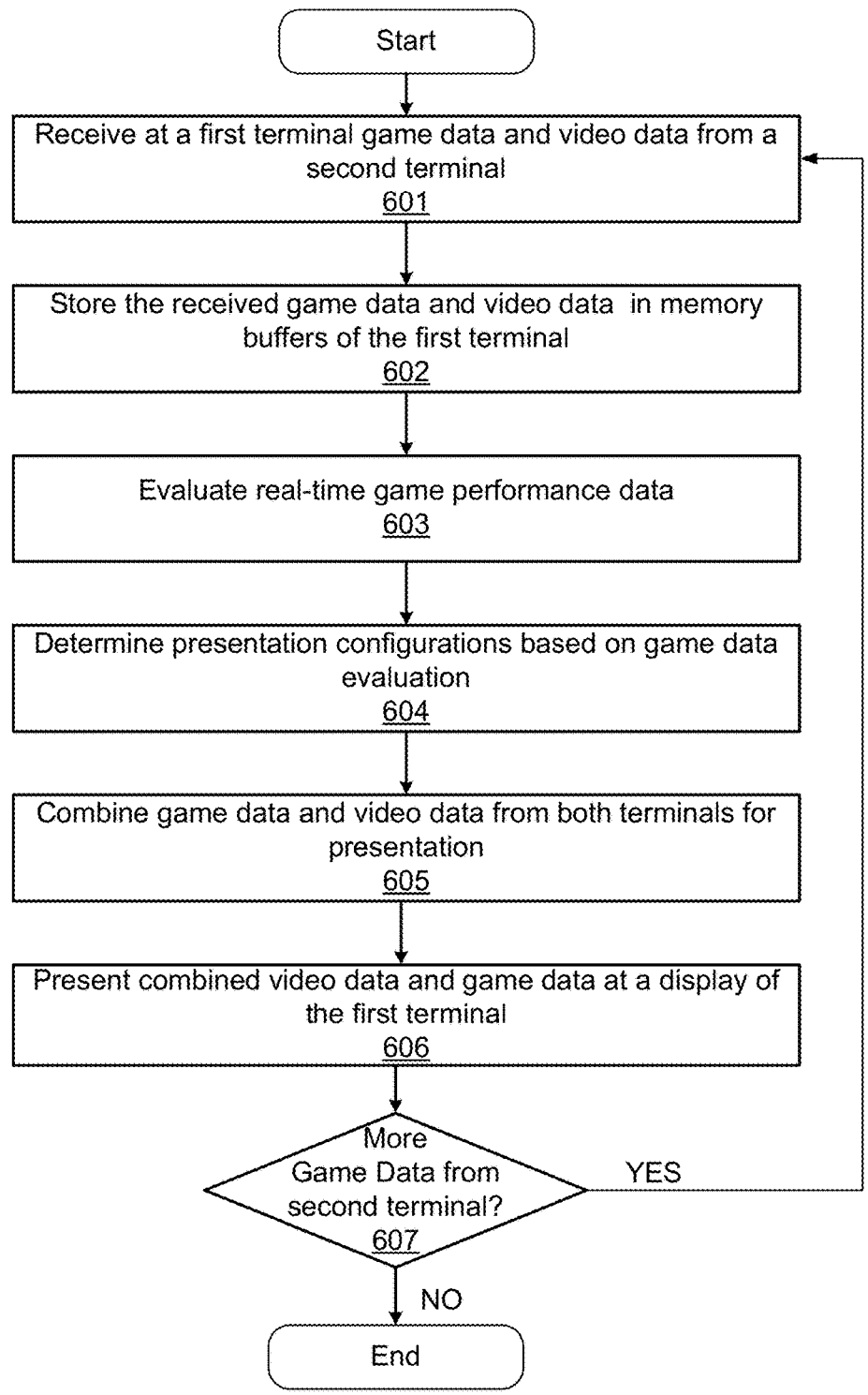
FIG. 6 is a flowchart illustrating a process of interactively combining end to end video and game data for the communication terminal illustrated in FIG. 5.

FIG. 6 is a flowchart illustrating a process of interactively combining end to end video and game data for the communication terminal (e.g., the first terminal 110) illustrated in FIG. 5. Initially, the first terminal 110 receives 601 remote game data and remote video data from the second terminal 130 and stores 602 the received game data and video data in memory buffers of the first terminal 110. The first terminal 110 evaluates 603 the real-time game performance data of the user of the first terminal 110 and determines 604, based on the game performance evaluation, presentation configurations to present the remote video data on the display of the first terminal 110. The presentation configurations include instructions for the first terminal 110 to display the remote video in a controlled video window, e.g., in terms of the transparency and location of the video window and resolution of the video content of the remote video data to be shown in the video window.

The first terminal 110 combines 605 the local video data associated with the first terminal 110 with the received remote video data and combines the local game data associated with the first terminal 110 with the received remote game data. The first terminal presents 606 the combined video data and the combined game data on the display of the first terminal 110 according to the presentation configuration. The first terminal 110 further checks 607 whether more game data comes from the second terminal 130. Responsive to more game data coming from the second terminal 130 (i.e., the game is not over), the first terminal 110 repeats the steps 601 to 606; otherwise, the first terminal 110 exists the process of combining the video data and game data of the two terminals.

Figure 7:
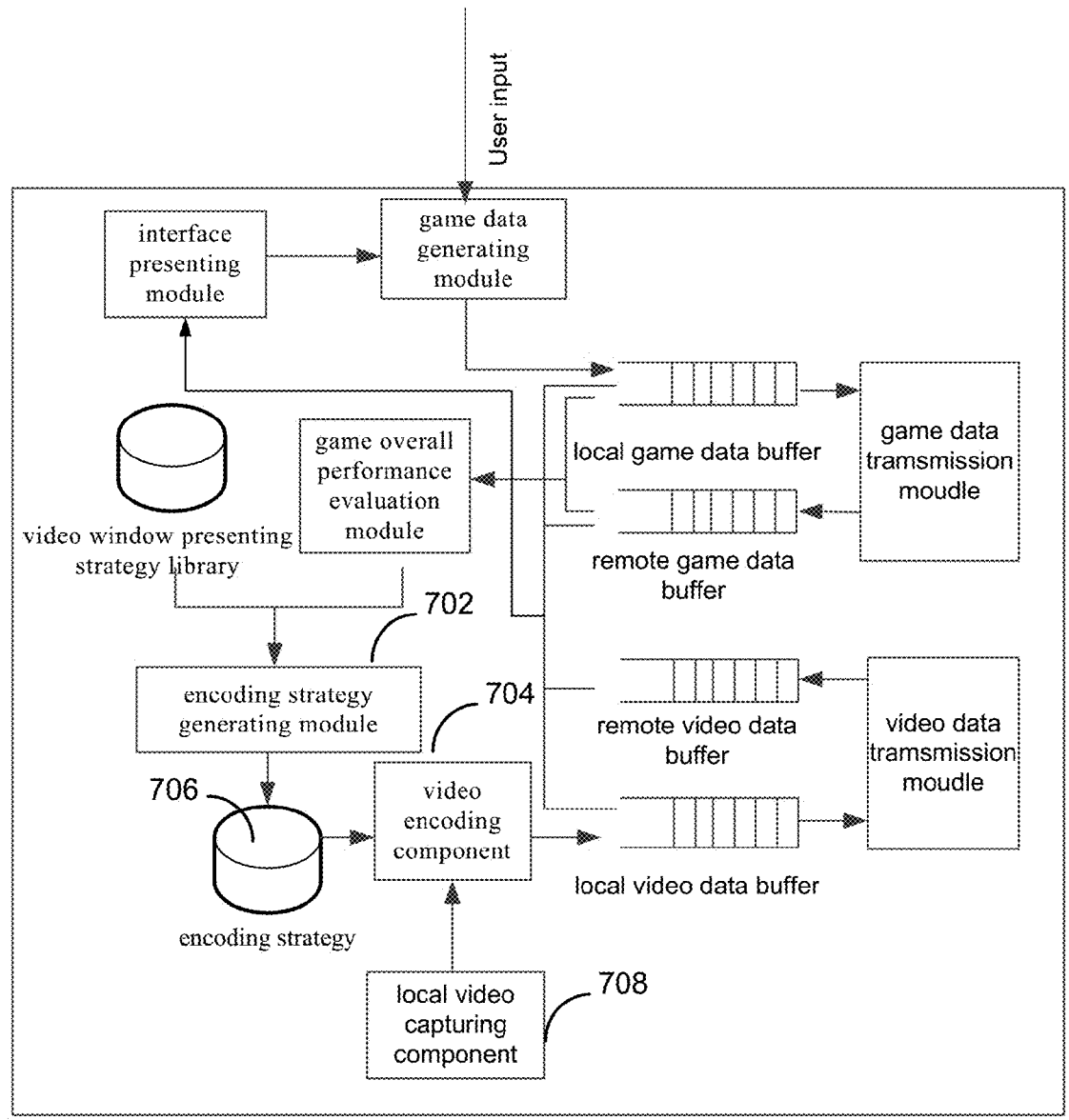
FIG. 7 is a block diagram illustrating a communication terminal for interactively combining end to end video and game data according to another embodiment.

FIG. 7 is a block diagram illustrating a communication terminal for interactively combining end to end video and game data according to another embodiment. Comparing with the first terminal 110 in illustrated FIG. 3 and FIG. 5, the communication terminal illustrated in FIG. 7 corresponds to the second terminal 130, i.e., the counter party of the first terminal 110. Furthermore, comparing with the first terminal 110 in illustrated FIG. 3, and FIG. 5, which controls how the video window for displaying the remote video data associated with the second terminal 130 on the display of the first terminal 110, the second terminal 130 illustrated in FIG. 7 controls how its associated video data is presented on the display of the first terminal 110.

The second terminal 130 includes all the modules as for the first terminal 110 illustrated in FIG. 3 and FIG. 5 and further includes an encoding strategy generating module 702, a video encoding component 704, an encoding strategy library 706 and a local video capturing module 708. The local video capturing module 708, e.g., a digital camera embedded with the second terminal 130, captures the video data from the video communication with the first terminal 110 and transmits the captured video data to the video encoding component 704 for encoding.

The video encoding component 704 encodes the local video data captured by the local video capturing component 708 according to an encoding strategy retrieved from the encoding strategy library 706. Any video encoding schemes known to those of ordinary skill in the art can be used to encode the local video data, such as motion estimation, motion compensation, quantization and entropy encoding. The video encoding component 704 stores the encoded local video data in a local video data buffer of the second terminal 130.

The encoding strategy library 706 stores video coding strategies generated by the encoding generating module 702. The encoding generating module 702 generates video coding strategies based on the overall game performance of the user of the first terminal 110 and video window presenting strategies stored in a video window presenting strategy library of the second terminal 130. In one embodiment, the second terminal 130 receives the overall game performance of the first terminal 110 directly from the first terminal 110. For example, for simple games, the first terminal 110 generates the overall game performance data and transmits the performance data to the second terminal 130. In another embodiment, the second terminal 130 receives the overall game performance of the first terminal 110 from a game server, or the first terminal 110 receives the overall game performance data of the first terminal from a game server and transmits the received game performance data to the second terminal 130. For example, for complex games, the first terminal 110 has the game server generate the overall game performance data of the first terminal 110.

Responsive to the overall game performance of the user of the first terminal 110 changes, the encoding generating module 702 updates the encoding strategy accordingly. In one embodiment, the overall game performance of a user of a terminal, e.g., the first terminal 110 or the second terminal 130, is classified into multiple predetermined levels or grades, each of which is related to encoding resolutions as shown in FIG. 10(*c*). Responsive to the overall game performance exceeding a predetermined level, the encoding generating module 702 updates the encoding strategy with the corresponding encoding resolution based on the overall game performance. The second terminal 130 transmits the encoded video data to the first terminal 110 for display, where the encoded video data includes information on how to present the video data associated with the second terminal 130.

Figure 8:
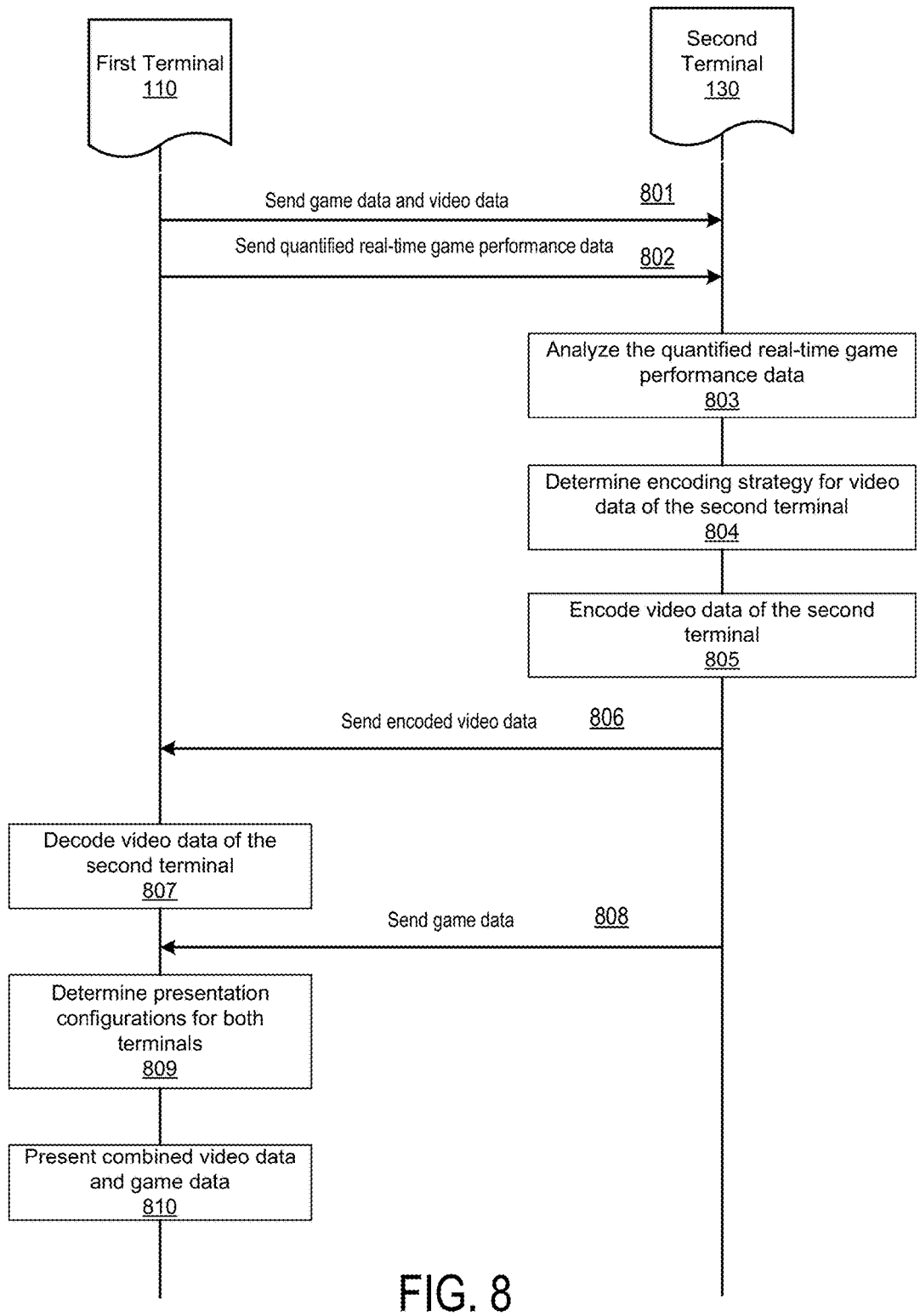
FIG. 8 illustrates interactions between two communication terminals for interactively combining end to end video and game data between the two communications terminals according to one embodiment.

FIG. 8 illustrates interactions between two communication terminals (e.g., the first terminal 110 and the second terminal 130) for interactively combining end to end video and game data between the two communications terminals according to one embodiment. Initially, the first terminal 110 sends 801 its game data and video data to the second terminal 130. The first terminal 110 also sends 802 its qualified real-time game performance data to the second terminal 130. The term "qualified" refers to the evaluated real-time game performance data of the user of the first terminal 110. The game performance can be either evaluated by the game overall performance evaluation module of the first terminal (e.g., the evaluation module 502 in FIG. 5) or by a game server (e.g., the game server 150 in FIG. 1).

The second terminal 130 analyzes 803 the received game performance of the user of the first terminal 110 and determines 804 an encoding strategy for encoding the local video data associated with the second terminal 130. The second terminal 130 encodes 805 the local video data associated with the second terminal 130 according to the determined encoding strategy and sends 806 the encoded video data to the first terminal 110. In one embodiment, the encoded video data includes information on how to present the video data associated with the second terminal 130.

The first terminal 110 receives the encoded video data from the second terminal 130 and decodes 807 the video data from the second terminal 130. The first terminal 110 determines 809 the presentation strategy for displaying the decoded video data based on the information associated with the encoded video data. The first terminal 110 presents 810 its local video data and the remote video data associated with the second terminal 130 with respect to the game interface for presenting the combined game data on the display of the first terminal 110.

Figure 9:
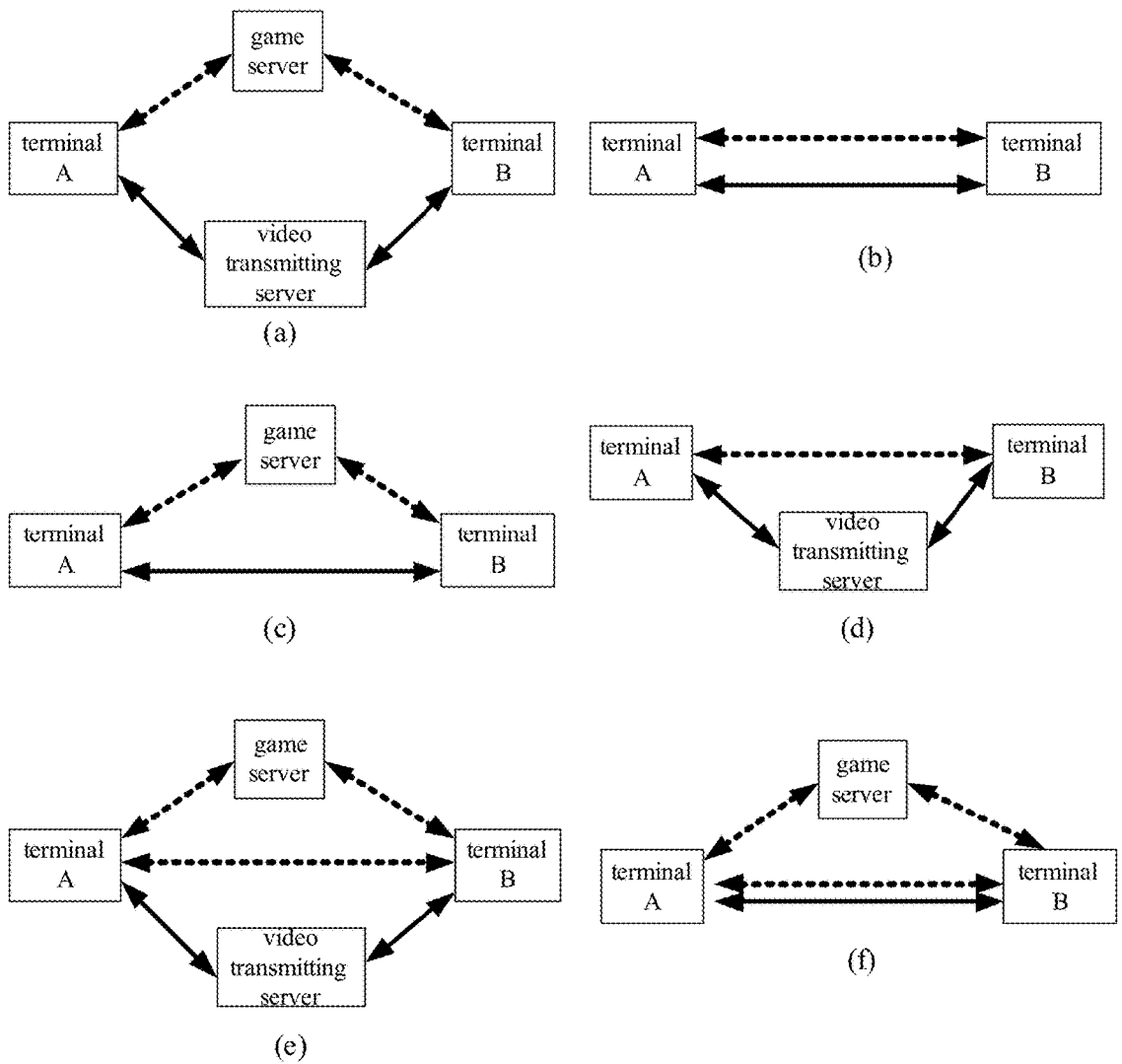
FIG. 9 illustrates exemplary network communication channels for transmitting video and game data between two communication terminals.

As shown in FIG. 1, the first terminal 110 communicates with the second terminal 130 by receiving and transmitting the video data and game data to and from each other. The first terminal 110 and the second terminal 130 may communicate with each other directly without intervention of a video sever, or a game server or both servers. FIG. 9 illustrates exemplary network communication channels for transmitting video and game data between the first terminal 110 and the second terminal 130.

FIG. 9(a) shows a terminal A (e.g., the first terminal 110) communicating with a terminal B (e.g., the second terminal 130) through a video transmitting server (e.g., a video relay server) to exchange their video data (shown in a solid line) and through a game server to exchange their game data (shown in a dotted line). FIG. 9(b) shows the terminal A and the terminal B directly exchanging their video data and game data without using a video transmitting server or a game server. FIG. 9(c) shows the terminal A and the terminal B exchanging their video data without using a video transmitting server and exchanging their game data through a game server. FIG. 9(d) shows the terminal A and the terminal B exchanging their video data using a video transmitting server and exchanging their game data without using a game server. FIG. 9(e) shows the terminal A and the terminal B exchanging their video data using a video transmitting server and exchanging their game data directly with each other and through a game server. For example, for a complex game played by the user of the terminals A and B, the two terminals may directly exchange their game data without using a game server, but may rely on the game server to perform user game performance evaluation for each terminal. FIG. 9(f) shows the terminal A and the terminal B exchanging their video data without using a video transmitting server and exchanging their game data directly with each other and through a game server.

A solution to enhanced user experience in digital media content sharing and consumption is to inactively combine video data from a video communication session with game data from a game session that is simultaneous with the video communication between two parties. Integrating a game session with a video communication session makes the video communication more joyful for the parties and video chatting while playing a game increases the players' interest in the game.

GENERAL

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for interactively combining video data and game data, the method comprising:
   receiving, at a first communication terminal, video data from a second communication terminal, the video data generated from a video communication between the first communication terminal and the second communication terminal;
   receiving, at the first communication terminal, game data from the second communication terminal data, the game data generated from a computer game played on the first communication terminal and the second communication terminal;
   generating combined video data from video data associated with the first communication terminal and received video data from the second communication terminal;
   generating combined game data from game data associated with the first communication terminal and received game data from the second communication terminal;
   determining a presentation strategy to display the combined video data and the combined game data on a display of the first communication terminal; and
   presenting the combined video data and the game data on the display of the first communication terminal according to the determined presentation strategy.

2. The method of claim 1, wherein determining the presentation strategy to display the combined video data and the combined game data comprises:
   determining presentation configurations to display the combined video data on the display of the first communication terminal with respect to presentation configurations to display the combined game data on the display of the first communication terminal.

3. The method of claim 2, wherein the presentation configurations to display the combined video data comprise:
   a video window to display the video data associated with the first communication terminal; and
   a video window to display the video data associated with the second communication terminal.

4. The method of claim 1, wherein the presentation configurations to display the combined game data comprises a game interface to display the combined game data on the display of the first communication terminal.

5. The method of claim 1, wherein determining the presentation strategy to display the combined video data and the combined game data further comprises:
adjusting the presentation strategy to display the combined video data in response to change to a game interface that displays the combined game data on the display of the first communication terminal.

6. The method of claim 5, wherein adjusting the presentation strategy to display the combined video data comprises:
determining updated presentation configurations to display the combined video data on the display of the first communication terminal; and
adjusting at least the video window for displaying the video data associated with the second communication terminal.

7. The method of claim 1, wherein determining the presentation strategy to display the combined video data and the combined game data further comprises:
evaluating game performance data associated with a player of the first communication terminal; and
updating the presentation strategy for displaying the combined video data based on the evaluation of the game performance data.

8. The method of claim 7, wherein evaluating the game performance data associated with the player of the first communication terminal comprises:
measuring the game performance data associated with the player of the first communication terminal;
comparing the measurement of the game performance data with a plurality of threshold values; and
responsive to the measure of the game performance data not exceeding a predefined threshold value, controlling presentation of a video window for displaying the video data associated with the second terminal.

9. The method of claim 8, wherein controlling the presentation of the video window for displaying the video data associated with the second terminal comprises:
adjusting transparency of the video window for displaying video data associated with the second terminal;
adjusting location of the video window within the display of the first terminal for displaying video data associated with the second terminal; and
adjusting resolution of the digital content of the video data associated with the second terminal.

10. The method of claim 1, wherein determining the presentation strategy to display the combined video data and the combined game data further comprises:
determining an encoding strategy for encoding the video data associated with the second communication terminal based, at least, on an evaluation of game performance data associated with a player of the first communication terminal;
encoding the video data associated with the second communication terminal according to the determined encoding strategy, wherein the encoded video data includes information on presentation configurations to display the video data associated with the second communication terminal on the display of the first communication terminal; and
transmitting the encoded video data from the second communication terminal to the first communication terminal.

11. A device for interactively combining video data and game data, the device as a first communication terminal communicating with a second communication terminal, comprising:
a computer processor for executing computer program modules; and
a non-transitory computer readable storage device storing computer program modules executable to perform steps comprising:
receiving, at the first communication terminal, video data from a second communication terminal, the video data generated from a video communication between the first communication terminal and the second communication terminal;
receiving, at the first communication terminal, game data from the second communication terminal data, the game data generated from a computer game played on the first communication terminal and the second communication terminal;
generating combined video data from video data associated with the first communication terminal and received video data from the second communication terminal;
generating combined game data from game data associated with the first communication terminal and received game data from the second communication terminal;
determining a presentation strategy to display the combined video data and the combined game data on a display of the first communication terminal; and
presenting the combined video data and the game data on the display of the first communication terminal according to the determined presentation strategy.

12. The device of claim 11, wherein determining the presentation strategy to display the combined video data and the combined game data comprises:
determining presentation configurations to display the combined video data on the display of the first communication terminal with respect to presentation configurations to display the combined game data on the display of the first communication terminal.

13. The device of claim 12, wherein the presentation configurations to display the combined video data comprise:
a video window to display the video data associated with the first communication terminal; and
a video window to display the video data associated with the second communication terminal.

14. The device of claim 11, wherein the presentation configurations to display the combined game data comprises a game interface to display the combined game data on the display of the first communication terminal.

15. The device of claim 11, wherein determining the presentation strategy to display the combined video data and the combined game data further comprises:
adjusting the presentation strategy to display the combined video data in response to change to a game interface that displays the combined game data on the display of the first communication terminal.

16. The device of claim 15, wherein adjusting the presentation strategy to display the combined video data comprises:
determining updated presentation configurations to display the combined video data on the display of the first communication terminal; and
adjusting at least the video window for displaying the video data associated with the second communication terminal.

17. The device of claim 11, wherein determining the presentation strategy to display the combined video data and the combined game data further comprises:

evaluating game performance data associated with a player of the first communication terminal; and updating the presentation strategy for displaying the combined video data based on the evaluation of the game performance data.

18. The device of claim 17, wherein evaluating the game performance data associated with the player of the first communication terminal comprises:

measuring the game performance data associated with the player of the first communication terminal;

comparing the measurement of the game performance data with a plurality of threshold values; and responsive to the measure of the game performance data not exceeding a predefined threshold value, controlling presentation of a video window for displaying the video data associated with the second terminal.

19. The device of claim 18, wherein controlling the presentation of the video window for displaying the video data associated with the second terminal comprises:

adjusting transparency of the video window for displaying video data associated with the second terminal;

adjusting location of the video window within the display of the first terminal for displaying video data associated with the second terminal; and adjusting resolution of the digital content of the video data associated with the second terminal.

20. The device of claim 11, wherein determining the presentation strategy to display the combined video data and the combined game data further comprises:

determining an encoding strategy for encoding the video data associated with the second communication terminal based, at least, on an evaluation of game performance data associated with a player of the first communication terminal;

encoding the video data associated with the second communication terminal according to the determined encoding strategy, wherein the encoded video data includes information on presentation configurations to display the video data associated with the second communication terminal on the display of the first communication terminal; and transmitting the encoded video data from the second communication terminal to the first communication terminal.

21. A non-transitory computer readable medium storing executable computer program instructions for interactively combining video data and game data, the computer program instructions comprising instructions for:

receiving, at a first communication terminal, video data from a second communication terminal, the video data generated from a video communication between the first communication terminal and the second communication terminal;

receiving, at the first communication terminal, game data from the second communication terminal data, the game data generated from a computer game played on the first communication terminal and the second communication terminal;

generating combined video data from video data associated with the first communication terminal and received video data from the second communication terminal;

generating combined game data from game data associated with the first communication terminal and received game data from the second communication terminal;

determining a presentation strategy to display the combined video data and the combined game data on a display of the first communication terminal; and presenting the combined video data and the game data on the display of the first communication terminal according to the determined presentation strategy.

22. The computer readable medium of claim 21, wherein the computer program instructions for determining the presentation strategy to display the combined video data and the combined game data comprise computer program instructions for:

determining presentation configurations to display the combined video data on the display of the first communication terminal with respect to presentation configurations to display the combined game data on the display of the first communication terminal.

23. The computer readable medium of claim 22, wherein the presentation configurations to display the combined video data comprise:

a video window to display the video data associated with the first communication terminal; and a video window to display the video data associated with the second communication terminal.

24. The computer readable medium of claim 21, wherein the presentation configurations to display the combined game data comprises a game interface to display the combined game data on the display of the first communication terminal.

25. The computer readable medium of claim 21, wherein the computer program instructions for determining the presentation strategy to display the combined video data and the combined game data further comprise computer program instructions for:

adjusting the presentation strategy to display the combined video data in response to change to a game interface that displays the combined game data on the display of the first communication terminal.

26. The computer readable medium of claim 25, wherein the computer program instructions for adjusting the presentation strategy to display the combined video data comprise computer program instructions for:

determining updated presentation configurations to display the combined video data on the display of the first communication terminal; and adjusting at least the video window for displaying the video data associated with the second communication terminal.

27. The computer readable medium of claim 21, wherein the computer program instructions for determining the presentation strategy to display the combined video data and the combined game data further comprise computer program instructions for:

evaluating game performance data associated with a player of the first communication terminal; and updating the presentation strategy for displaying the combined video data based on the evaluation of the game performance data.

28. The computer readable medium of claim 27, wherein the computer program instructions for evaluating the game performance data associated with the player of the first communication terminal comprise computer program instructions for:

measuring the game performance data associated with the player of the first communication terminal;

comparing the measurement of the game performance data with a plurality of threshold values; and responsive to the measure of the game performance data not exceeding a predefined threshold value, controlling presentation of a video window for displaying the video data associated with the second terminal.

29. The computer readable medium of claim 28, wherein the computer program instructions for controlling the presentation of the video window for displaying the video data associated with the second terminal comprise computer program instructions for:
- adjusting transparency of the video window for displaying video data associated with the second terminal;
- adjusting location of the video window within the display of the first terminal for displaying video data associated with the second terminal; and
- adjusting resolution of the digital content of the video data associated with the second terminal.

30. The computer readable medium of claim 21, wherein the computer program instructions for determining the presentation strategy to display the combined video data and the combined game data further comprise computer program instructions for:
- determining an encoding strategy for encoding the video data associated with the second communication terminal based, at least, on an evaluation of game performance data associated with a player of the first communication terminal;
- encoding the video data associated with the second communication terminal according to the determined encoding strategy, wherein the encoded video data includes information on presentation configurations to display the video data associated with the second communication terminal on the display of the first communication terminal; and
- transmitting the encoded video data from the second communication terminal to the first communication terminal.

\* \* \* \* \*